US008005703B2

(12) United States Patent
Chakra et al.

(10) Patent No.: US 8,005,703 B2
(45) Date of Patent: Aug. 23, 2011

(54) EVENT SCHEDULING FORECASTING FOR A CALENDARING SYSTEM USING HISTORICALLY COLLECTED EVENT DATA

(75) Inventors: Al Chakra, Apex, NC (US); Siddharth P. Desai, Virginia Beach, VA (US); Zachary J. H. Marlow, Raleigh, NC (US); Tejaswini R. Patil, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/176,021

(22) Filed: Jul. 18, 2008

(65) Prior Publication Data

US 2010/0017216 A1 Jan. 21, 2010

(51) Int. Cl.
*G06Q 10/00* (2006.01)

(52) U.S. Cl. ............... 705/7.19; 705/7.13; 705/7.16; 705/7.18; 705/7.24

(58) Field of Classification Search ......... 705/7.11–7.42
See application file for complete search history.

(56) References Cited

U.S. PATENT DOCUMENTS

| | | | |
|---|---|---|---|
| 5,124,912 A | 6/1992 | Hotaling et al. | |
| 5,781,731 A | 7/1998 | Koreeda et al. | |
| 5,918,219 A | 6/1999 | Isherwood | |
| 6,035,278 A | 3/2000 | Mansour | |
| 7,167,833 B2 | 1/2007 | Mashiko et al. | |
| 7,788,486 B2 * | 8/2010 | Miller et al. ................. | 713/158 |
| 2004/0064585 A1 * | 4/2004 | Doss et al. ................... | 709/246 |
| 2004/0267591 A1 * | 12/2004 | Hedlund et al. ............... | 705/9 |
| 2006/0047557 A1 * | 3/2006 | Bieselin et al. ............... | 705/9 |
| 2006/0293943 A1 * | 12/2006 | Tischhauser et al. ............ | 705/9 |
| 2007/0010983 A1 * | 1/2007 | Bauer et al. ................... | 703/17 |
| 2007/0067709 A1 * | 3/2007 | Portnykh et al. ............ | 715/500.1 |
| 2007/0118415 A1 * | 5/2007 | Chen et al. ................... | 705/8 |
| 2007/0136118 A1 * | 6/2007 | Gerlach et al. ................. | 705/8 |
| 2008/0059256 A1 * | 3/2008 | Lynch ........................... | 705/7 |
| 2008/0091504 A1 * | 4/2008 | Lyle et al. ..................... | 705/9 |
| 2008/0114638 A1 * | 5/2008 | Colliau et al. ................. | 705/9 |
| 2008/0140488 A1 * | 6/2008 | Oral et al. ..................... | 705/8 |
| 2009/0055238 A1 * | 2/2009 | Baryshnikov et al. .......... | 705/8 |
| 2009/0076834 A1 * | 3/2009 | Rauber et al. ................. | 705/1 |
| 2009/0089133 A1 * | 4/2009 | Johnson et al. ................ | 705/9 |

OTHER PUBLICATIONS

Aronowitz et al. "Retail Event Collaboration—Business Process Guide" (May 6, 2004), http://www.gs1.org/docs/GSM0401.pdf.*
Minneman et al. "A Confederation of Tools for Capturing and Accessing Collaborative Activity" (1995) ACM Multimedia 95—Electronic Proceedings.*

(Continued)

*Primary Examiner* — Scott L Jarrett
*Assistant Examiner* — Sujay Koneru
(74) *Attorney, Agent, or Firm* — Patents on Demand, P.A.; Brian K. Buchheit; Scott M. Garrett

(57) ABSTRACT

The present invention discloses a solution for event scheduling forecasting for a calendaring system using historically collected event data. In the solution, metrics collected from historic events can be utilized to compute event duration for scheduled and events being scheduled. Metrics such as number of attendees, quantity of topics being covered, and meeting duration can be collected. Metrics can be aggregated from one or more systems including, but not limited to, calendaring systems and presentation systems. A forecasting engine can utilize metrics to compute a duration for events which can be used to advise event coordinators, adjust scheduled event times, and notify of potential schedule conflicts.

14 Claims, 4 Drawing Sheets

OTHER PUBLICATIONS

Moran et al. "I'll Get That Off the Audio: A Case Study of Salvagin Multimedia Records" (1997) Proceedings of CHI'97.*

Padwick, Gordon et al. "Special Edition Using Microsoft Outlook 2000" (May 1999), ISBN: 0/7897-1909-6.*

Allen "Project Management Tips" (2011) Project Kickstart.*

"Event Planning manual" (Date Unknown) Lesley University.*

EmailPRESENTER (May 2008) PresentationPro, Inc.*

* cited by examiner

EVENT SCHEDULING FORECASTING FOR A CALENDARING SYSTEM USING HISTORICALLY COLLECTED EVENT DATA

BACKGROUND OF THE INVENTION

The present invention relates to the field of collaborative calendaring systems and, more particularly, to event scheduling forecasting for a calendaring system using historically collected event data.

Accurately allotting time for events (e.g., meetings, presentations, etc.) can often be a difficult task. Such factors can include number of attendees, quantity of topics being covered, and event location availability. A common tactic coordinators employ is to use "round numbers" such as hours and half-hours to schedule events. However, when a coordinator schedules too much or too little time for an event, event participants are adversely affected. For instance, when a meeting lasts longer than scheduled time, the meeting can conflict with participant's subsequently planned events. When events terminate early, attendees are often left waiting for another scheduled event to begin. During this time, attendees are typically not very productive because their work is affected by a subsequently scheduled events or they a left with a short period of time which proves difficult to accomplish tasks within.

One approach that is used to overcome these scheduling problems is to synchronize events based on attendee scheduling preferences. While this method is useful, it still relies on coordinators and attendees to set preferences and make estimates which are used as inputs to calculate the duration of events. Since coordinators and attendees regularly make imprecise estimates, this method also suffers from major drawbacks. At present, there are no ideal solutions for overcoming these scheduling challenges/obstacles.

DETAILED DESCRIPTION OF THE INVENTION

Figure 1:
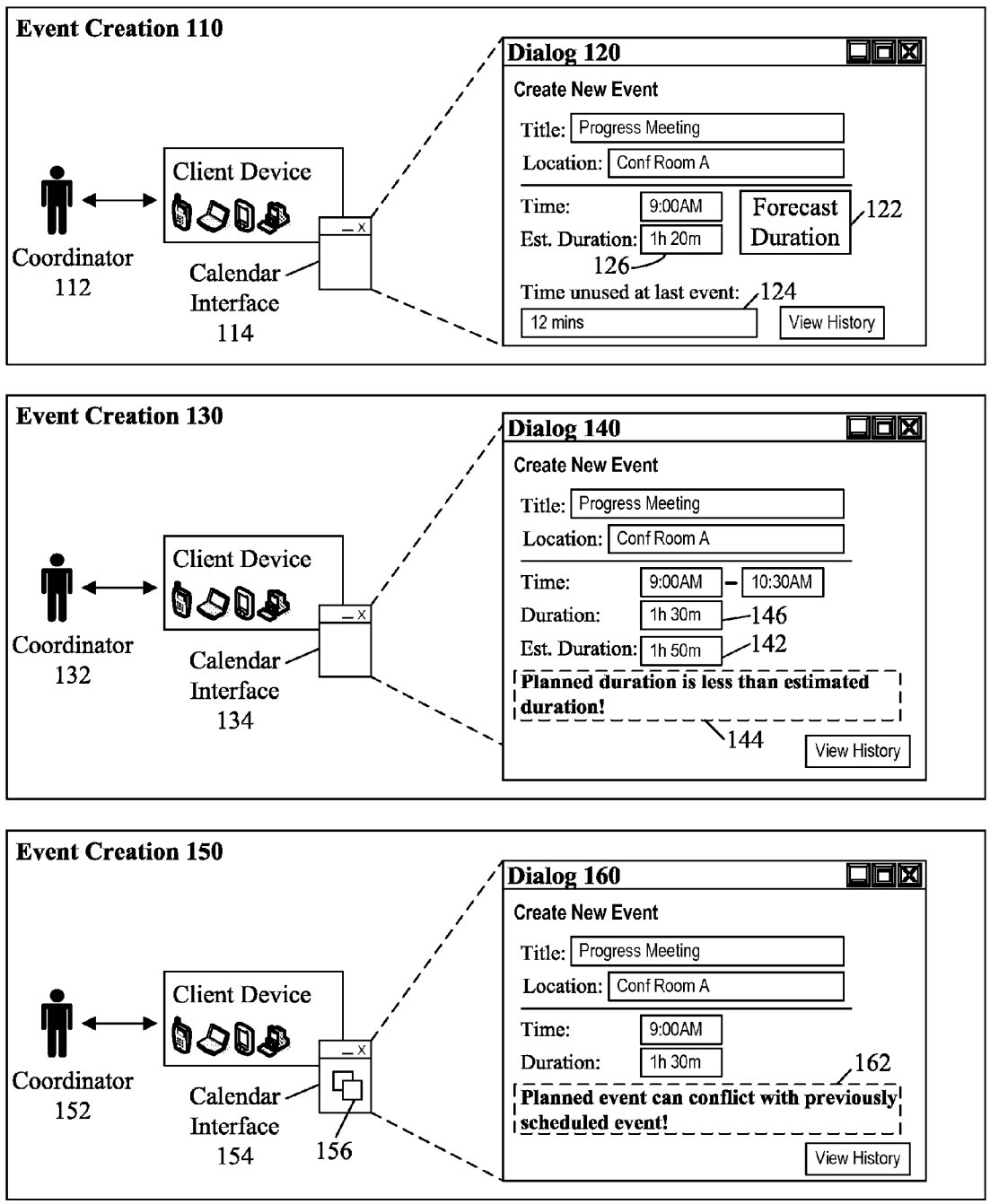
FIG. 1 is a schematic diagram illustrating a set of scenarios for utilizing a forecasted event duration to plan schedule events in accordance with an embodiment of the inventive arrangements disclosed herein.

The present invention discloses a solution for event duration forecasting for a calendaring system using historically collected event data. In the solution, metrics collected from historic events can be utilized to compute an event duration for a scheduled event. Metrics such as number of attendees, quantity of topics being covered, and meeting duration can be collected. Metrics can be aggregated from one or more systems including, but not limited to, calendaring systems and presentation systems. A forecasting engine can utilize metrics to compute a duration for events which can be used to advise event coordinators, adjust scheduled event times, and notify of potential schedule conflicts.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a set of scenarios 110-150 for utilizing a forecasted event duration to plan schedule events in accordance with an embodiment of the inventive arrangements disclosed herein. In scenarios 110-150, coordinators 112-152 can be assisted in event scheduling by event duration forecasting. Calendar interface 114-154 can present dialogs 120-160 which enable event forecasting capabilities to be presented to coordinators 112-152. Based on user entered data in dialog 120, an appropriate event history for determining an event duration can be identified. For instance, based on title and location information, historic metrics from "progress meetings" can be used to estimate event duration. Forecasted duration represents a best-fit estimation for the duration of an event based on historic metrics.

In scenario 110, an event being planned by coordinator 112 can be forecasted based on historically collected event metrics. Utilizing artifact 122 coordinator can be presented with an estimated time duration 126 for the event being considered. The coordinator can choose to use the computed event duration to create the new event. Alternatively, based on information 124 presented, coordinator 112 can attempt to manually determine the duration for the event being planned.

In scenario 130, coordinator 132 can be notified of potential duration issues associated with an event being created. A computed duration 142 can be compared against a duration 146 established by coordinator 132. Based on the result of the comparison, a notification 144 can be presented in interface 134. For instance, when duration 142 is greater than user selected duration 146, a notification can alert the coordinator 132 that the event duration can exceed the user selected duration 146.

In scenario 150, computed event duration can be used to aid a calendar user 152 in handling potential scheduling conflicts. User 152 accepting an event using dialog 160 can be alerted of a potential conflict with a previously scheduled event 156. Explicitly established times for the events may not actually conflict, which could preclude acceptance, but forecasted times (e.g., anticipated time overruns based upon forecaster estimated durations) can indicate likely problems with being able to attend all scheduled meetings. The notification 162 can alert user 152 of a forecaster predicted problem.

Scenarios 110-150 are for illustrative purposes only and should not be construed to limit the invention in any regard. Interface dialogs 120-160 are for demonstrative purposes and do not reflect the only contemplated embodiment. Interface 114-154 can include, but is not limited to, a graphical user interface (GUI), a voice user interface (VUI), a multi-modal interface, and the like.

Figure 2:
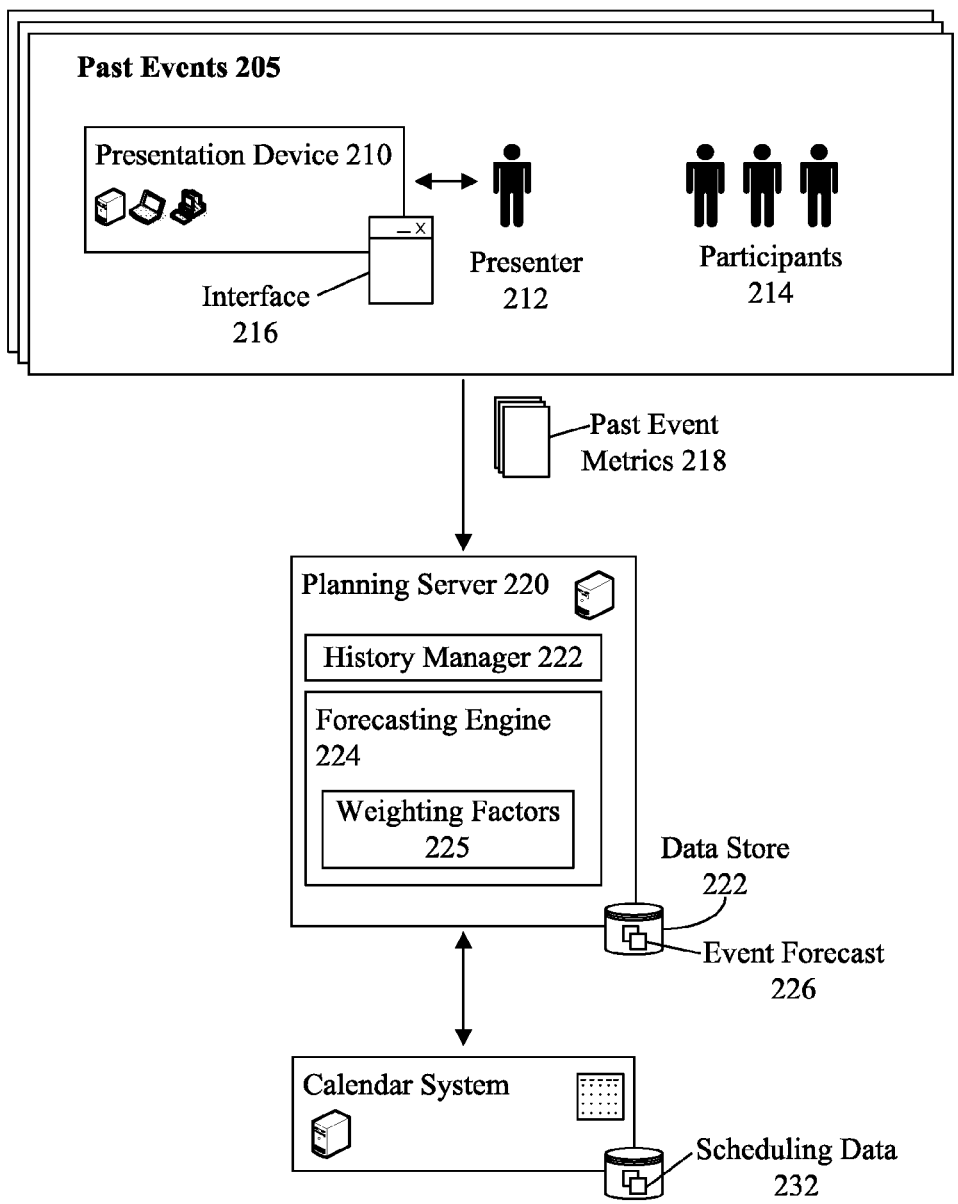
FIG. 2 is a schematic diagram illustrating a system where a set of collected event metrics is employed in the forecasting of an event duration in accordance with an embodiment of the inventive arrangements disclosed herein.

FIG. 2 is a schematic diagram illustrating a system 200 where a set of collected events metrics is employed in the forecasting of an event duration in accordance with an embodiment of the inventive arrangements disclosed herein. In system 200, past events metrics 218 can be used to generate a duration forecast for an event. Planning server 220 can utilize metrics 218 in association with scheduling data 232 to compute a duration for a given event.

As used herein, past events 205 can include any historic event wherein metrics can be obtained. Events 205 can include, but is not limited to, meetings, interviews, open discussions, conventions, and the like. In past events 205, presenter 212 can be a set or subset of participants 214. Event forecast 226 can include a start and end time, duration, and a start time and duration.

During past events 205, presentation device 210 can collect metrics 218 which can be conveyed and stored in data store 222. Metrics 218 can be collected through interface 216 such as the number of participants 214, the time each presenter 212 utilizes for the event, topic information, the length of the event, and the like. For instance, interface 216 can record the time spent on each slide of a slideshow presentation for an event. Further, individual metrics can be tracked for each participant, which can be used in part to compute an aggregate duration based on individual metrics.

Planning server 220 can be a hardware/software component able to compute a time duration for one or more events. Server can include components such as history manager 222 and forecasting engine 224. Computed event forecasts 226 can be stored in data store which can be conveyed to a requesting system for processing.

History manager 222 can process metrics 218 and enable users to access past event metrics 218. Manager 222 can be configured to process and present relevant metrics to forecasting engine 224 during the forecast process. Verification of metrics can be performed by manager 222 to ensure that metric anomalies do not completely bias event 205 metrics. Additionally, manager 222 can allow users to search and/or browse historic metrics 218. For instance, a user can audit previous event durations to adjust forecast accuracy.

Forecasting engine 224 can calculate an estimated duration for an event based on one or more metrics 218. In one embodiment, engine 224 can be used to model new events based on specific types of past events 205. For instance, users can establish product review meetings as a model which specific metrics can be matched against to form a blueprint for future events. Engine 224 can heuristically determine durations for events based on agenda information associated with events. Further, engine 224 can be utilized data 232 to determine location availability to evade conflicts for forecasted events.

Weighting factors 225 can affect how metrics are applied to forecasting. For instance, past meeting lengths can be allowed to affect forecasting results more significantly than the number of attendees. Alternatively, participants who historically utilize a significant portion of event time can be used to skew event durations when they are shown to be a participant for the event. Weighting factors 225 can be influenced in part by user preferences established in system 230.

Figure 3:
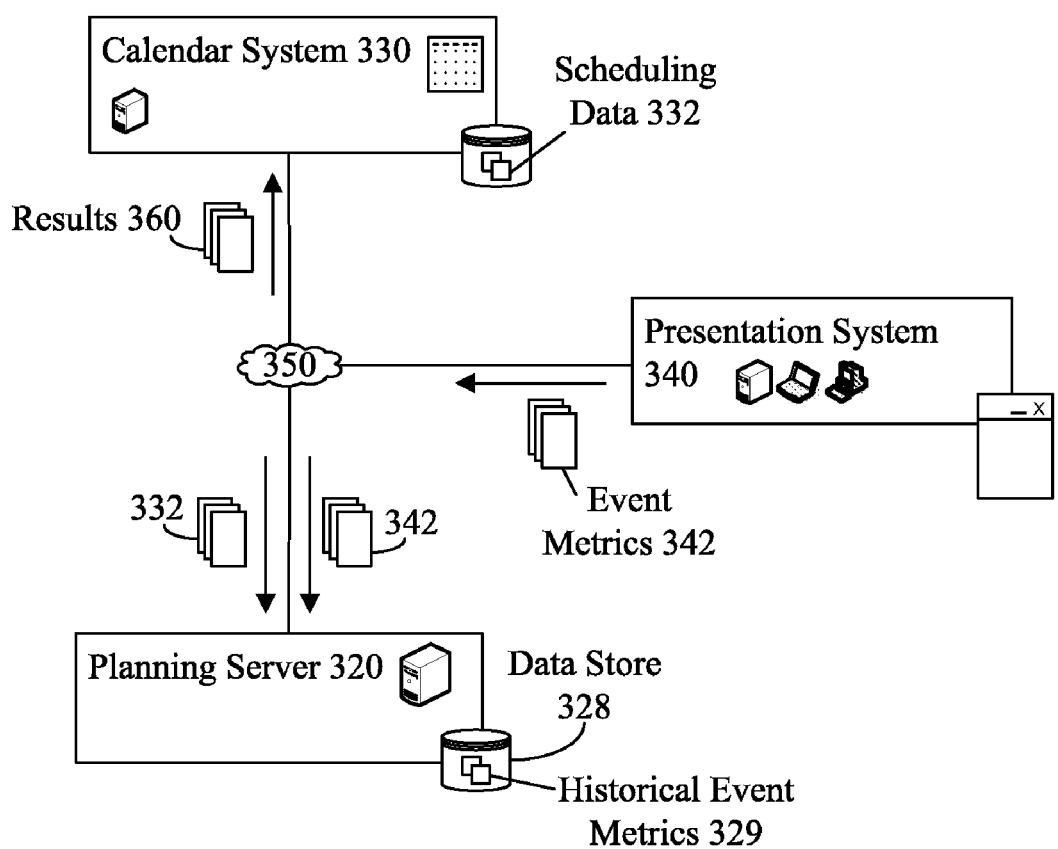
FIG. 3 is a schematic diagram illustrating a system for performing event duration forecasting in accordance with an embodiment of the inventive arrangements disclosed herein.

FIG. 3 is a schematic diagram illustrating a system 300 for performing event duration forecasting in accordance with an embodiment of the inventive arrangements disclosed herein. In system 300, event metrics 342 collected from a presentation system 340 can be conveyed via network 350 to a planning server 320. Planning server 320 can provide a request/response mechanism to enable event forecasting capabilities in a calendaring system 330. Users of calendar system 330 can be presented with a forecasted event duration which can be comprised in result 360.

Presentation system 340 can be a hardware/software component capable of visually and/or aurally presenting content to one or more participants. System 340 can include, slide projectors, presentation software (e.g., slideshow programs), teleconferencing software, videoconferencing software, and the like. Presentation system 340 can utilize technologies to collect metrics 342 such as biometrics, presence detection, voice recognition, face recognition, and the like. For instance, a presenter of a meeting can be identified and his "floor time" recorded for use in future forecasting.

Users of calendar system 330 can receive forecast duration for desired events. System 330 can request a one or more duration forecasts for one or more events. For instance, users can choose to "optimize" their events for a busy day. Additionally, requests for alternative start and duration times can be requested based on user preference, conflict schedules with other participants, and other extenuating factors.

Planning server 320 can use stored historical event metrics 329 in association with scheduling data 332 to produce forecast result 360. In one embodiment, functionality encapsulated in planning server 320 can be performed by a Web service. In another embodiment, server 320 functionality can be present in system 330.

Figure 4:
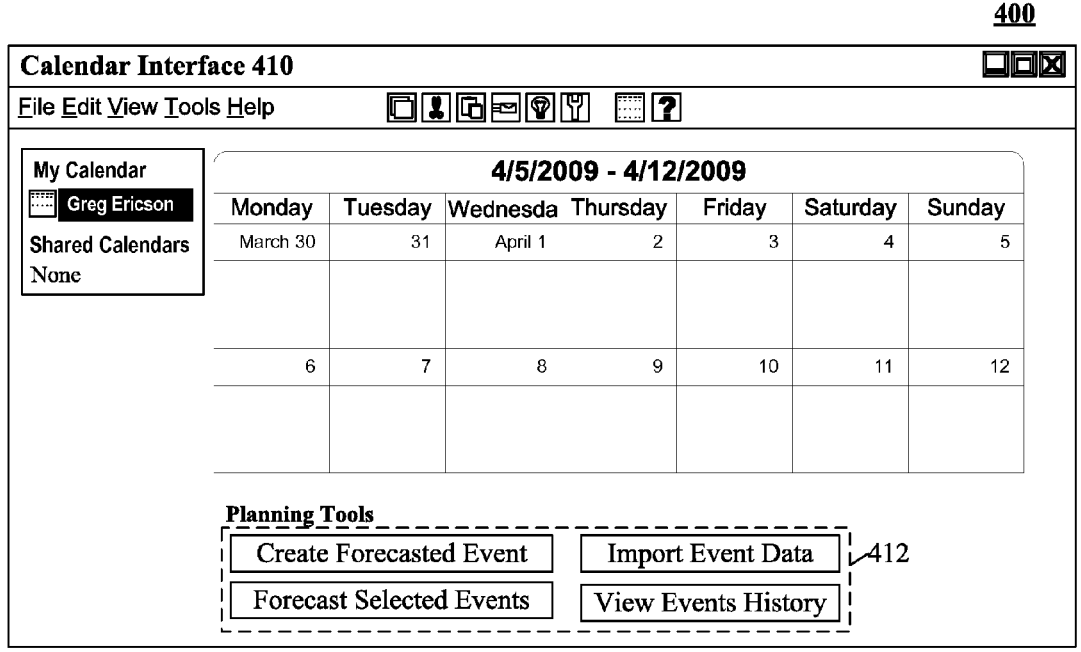
FIG. 4 is a schematic diagram illustrating a calendaring interface with event duration forecasting capabilities in accordance with an embodiment of the inventive arrangements disclosed herein.
Figure 4:
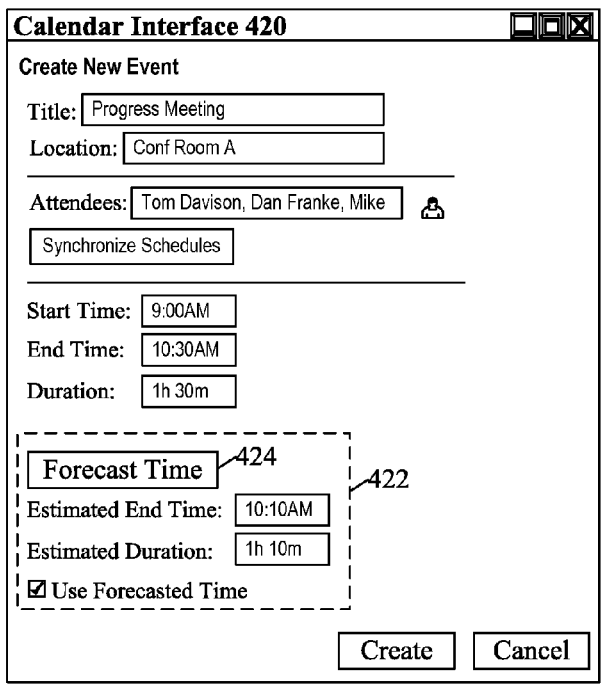

FIG. 4 is a schematic diagram illustrating a calendaring interface 410, 420 with event duration forecasting capabilities in accordance with an embodiment of the inventive arrangements disclosed herein. In interface 410, 420, a calendaring system can permit a user to forecast the duration for events. Interface 410, 420 can include one or more interface artifacts 412, 422 associated with performing event forecasting activities.

Interface 410 can be a calendar interface 410 associated with a calendaring application with forecasting capabilities. For instance, interactive menu buttons 412 can be presented in the calendar interface 410 to aid a user in creating planned events. Additionally, presented artifacts 412 can be used to forecast planned events to verify or improve the accuracy of the duration of the planned events. Further, artifacts 412 can permit users to manually input event metrics which can include manual data entry, file imports, uniform resource identifier (URI) addressable content, and the like.

Interface 420 can be an event planning dialog able to help users plan events more accurately by providing a forecasted duration for the event. Interface 420 can allow the user to select start and end times for a planned events with an option to use a forecasted duration for the event. For instance, interactive button 424 can invoke a forecast calculation for the event based on user entered data. The user can optionally override user entered time and duration by selecting the appropriate interface artifact.

Interfaces 410-420 are for illustrative purposes only and should not be construed to limit the invention in any regard. Interface 410-420 can include, but is not limited to, a graphical user interface (GUI), a voice user interface (VUI), a multimodal interface, and the like.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for forecasting event duration comprising:
   collecting automatically, via a computing device, historical presentation events metrics from at least one of plurality of sources, the collected historical presentation event metrics including time spent on each slide of a slideshow presentation used by one or more presenters;
   storing the historical presentation event metrics in a history manager;
   identifying, via a computing device, an event in a calendaring system and an associated time duration approximation to be forecasted for the event, the event including a start time and end time associated with the event used by the calendaring system, the start and end time established by manually entered user input provided via a user interface of the calendaring system, and the event consisting of a visual or oral presentation, where at least one presenter provides the presentation to a plurality of attendees;
   computing, via a computing device the time duration approximation for the identified event, the time duration approximation computed using the historical metrics, and based on: a number of attendees of the event, a quantity of topics being covered by the event, and a number of presenters of the event;
   storing the time duration approximation, which is a forecast time, for the event in a calendaring system while also maintaining the manually entered start and end time for the event, wherein no scheduling conflict would exist for the event assuming that the manually entered start and end time reflect actual times for the event;
   automatically detecting a potential conflict when the manually entered start and end time for the event conflicts with the forecast time for the event; and;
   responsive to automatically detecting the potential conflict, automatically alerting at least one user of the calendaring system of the potential conflict via the user interface; and
   enabling the user of the calendaring system to modify the event in the calendaring system and automatically providing suggestions to the at least one user of the calendaring system based upon the computed time duration approximation.

2. The method of claim 1, wherein the collected event metrics are manually inputted.

3. The method of claim 1, wherein the time duration is compared to the manually entered start and end time of the event.

4. The method of claim 3, wherein the programmatic action is a modification of the manually entered start and end time of the event.

5. The method of claim 1, wherein the time duration is compared to an event to be scheduled, wherein the comparison results in at least one programmatic action being performed, wherein the programmatic action is at least one notification being presented.

6. A system for forecasting event duration comprising:
   a history manager configured to store historical presentation event metrics from at least one of a plurality of sources, wherein said historical presentation event metrics include time spent on each slide of a slideshow presentation used by one or more of the presenters;
   a forecasting engine configured to interact with a calendaring system to perform one of optimizing scheduled calendar events and to automatically provide suggestions to users of the calendaring systems based upon durations computed by the forecasting engine, wherein at least one of said calendar events, referred to as the event, comprise a start time and end time associated with the event that were established by manually entered user input provided via a user interface of the calendaring system, wherein the event consists of a visual or oral presentation, where at least one presenter provides the presentation to a plurality of attendees, wherein the forecasting engine computes a time duration approximation for the event based on the collected historical event presentation metrics, the time duration approximation computing using the historical event presentation metrics, and based on: a number of presenters of the event, wherein the time duration approximation, which is the forecast time, is stored for the event in the calendaring system while also maintaining the manually entered start and end time for the event, wherein no scheduling conflict would exist for the event assuming that the manually entered start and end time reflect actual times for the event;
   a presentation system comprising hardware and software configured to visually and/or aurally presenting stored content to a plurality of participants during the event associated with the calendaring system, wherein the forecasting engine utilizes presentation information from the presentation system to compute the time duration for the event and
   at least one component for automatically detecting a potential conflict when the manually entered start and end time for the event conflicts with the forecast time for the event; for responsive to automatically detecting the potential conflict, automatically alerting at least one user of the calendaring system of the potential conflict via the user interface; and for enabling the user of the calendaring system to optimize the event in the calendaring system or automatically providing suggestions to the at least one user of the calendaring system based upon the computed time duration approximation.

7. The system of claim 6, wherein the history manager is linked to said calendaring system and automatically acquires duration information regarding events of the calendaring system.

8. The system of claim 6, wherein the forecasting engine computes a time duration associated with at least one of a scheduled event and an event to be scheduled, wherein said system further comprises:
   the calendaring system, wherein said calendaring system is configured to store the time duration computed by the forecast engine for the event while also maintaining the manually entered start and end time for the event, wherein the start and end time were established by manually entered user input provided via a user interface of the calendaring system, wherein said user interface is a user interface of the calendaring system.

9. The system of claim 6, wherein the forecasting system is accessible from at least one of a uniform resource identifier (URI) addressable location and a Web service.

10. A computer program product for forecasting event duration comprising:
- a computer usable medium having computer usable program code embodied therewith, the computer usable program code comprising:
- computer usable program code configured to collecting automatically, via a computing device, historical presentation event metrics from at least one of plurality of sources, the collected historical presentation event metrics including time spent on each slide of a slideshow presentation used by one or more presenters;
- computer usable program code configured to store the historical presentation event metrics in a history manager;
- computer usable program code configured to identify, via a computing device, an event in a calendaring system and an associated time duration approximation to be forecasted for the event, the event including a start time and end time associated with the event used by the calendaring system, and the event consisting of a visual or oral presentation, where at least one presenter provides the presentation to a plurality of attendees;
- computer usable program code configured to compute, via a computing device, the time duration approximation for the identified event, the time duration approximation computed using the historical event presentation metrics, and based on: a number of attendees of the event, a quantity of topics being covered by the event, and a number of presenters of the event;
- computer usable program code configured to store the time duration approximation, which is a forecast time, for the event in a calendaring system while also maintaining the manually entered start and end time for the event, wherein no scheduling conflict would exist for the event assuming that the manually entered start and end time reflect actual times for the event;
- computer usable program code configured to automatically detect a potential conflict when the manually entered start and end time for the event conflicts with the forecast time for the event;
- computer usable program code configured to responsive to automatically detecting the potential conflict, automatically alert at least one user of the calendaring system of the potential conflict via the user interface; and
- computer usable program code configured to enable the user of the calendaring system to modify the event in the calendaring system and automatically providing suggestions to the at least one user of the calendaring system based upon the computed time duration approximation.

11. The computer program product of claim 10, wherein the collected event metrics are manually inputted.

12. The computer program product of claim 10, wherein the time duration is compared to the manually entered start and end time of the event, wherein the comparison results in at least one programmatic action being performed.

13. The computer program product of claim 10, wherein the time duration is compared to an event to be scheduled, wherein the comparison results in at least one programmatic action being performed, wherein the programmatic action is at least one of a notification being presented.

14. The system of claim 8, wherein said calendaring system is configured to automatically detect a potential conflict involving the event, where no conflict results if the manually entered start and end time for the event is accurate, yet where a scheduling conflict indicated by the potential conflict would result if the forecast time, which conflicts with the manually entered time, is accurate.

* * * * *